(12) United States Patent
Wiatrowski

(10) Patent No.: US 8,738,052 B2
(45) Date of Patent: May 27, 2014

(54) METHOD AND APPARATUS FOR UPDATING AND USING UPDATED GROUP ALIASES AND INCIDENT IDS

(75) Inventor: David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 231 days.

(21) Appl. No.: 13/329,480

(22) Filed: Dec. 19, 2011

(65) Prior Publication Data

US 2013/0157558 A1 Jun. 20, 2013

(51) Int. Cl.
*H04H 20/71* (2008.01)

(52) U.S. Cl.
USPC .......... 455/500; 455/3.01; 455/517; 455/518; 455/519; 455/520; 455/521; 455/556.1; 709/203

(58) Field of Classification Search
USPC .............. 455/500, 3.01, 517–521, 556.1; 709/203
See application file for complete search history.

(56) References Cited

U.S. PATENT DOCUMENTS

| 8,204,473 | B2 * | 6/2012 | Mathis et al. | 455/404.1 |
| 2009/0184164 | A1 * | 7/2009 | Sparks | 235/382 |
| 2011/0161399 | A1 * | 6/2011 | Agulnik et al. | 709/203 |

* cited by examiner

*Primary Examiner* — Bobbak Safaipour
(74) *Attorney, Agent, or Firm* — Daniel R. Bestor

(57) ABSTRACT

An updated group alias, based on one or more of a location, function, and purpose of a group, is transmitted to a subscriber unit (SU) and displayed at the SU, in place of a previously provisioned group ID or group alias associated with the group, during communications with, or when the SU is tuned to, the group. An incident ID, associated with one or more groups and identifying an incident, is received and stored at a SU. The SU embeds the stored incident ID in all future communications with the one or more groups and, upon request, scans a set of groups and/or channels for communications having the incident ID embedded therein. An incident ID alias described one or more of a name, location, function, or purpose of the incident, may also be received and associated with the incident ID.

14 Claims, 13 Drawing Sheets

METHOD AND APPARATUS FOR UPDATING AND USING UPDATED GROUP ALIASES AND INCIDENT IDS

FIELD OF THE DISCLOSURE

The present disclosure relates generally to two-way wireless communication systems.

BACKGROUND OF THE DISCLOSURE

Wireless communication systems provide for radio communication links to be arranged within the system between a plurality of user terminals. Such user terminals may be mobile and may be known as 'mobile stations' or 'subscriber units.' At least one other terminal, e.g. used in conjunction with subscriber units, may be a fixed terminal, e.g. a control terminal, base station, repeater, and/or access point. Such a system typically includes a system infrastructure which generally includes a network of various fixed terminals, which are in direct radio communication with the subscriber units. Each of the base stations operating in the system may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the system are made via respective serving fixed terminals. Sites of neighboring fixed terminals in a wireless communication system may be offset from one another or may be non-overlapping or partially or fully overlapping. In another example in which subscriber units can operate in a direct mode (e.g., without having to pass through a repeater or base station), a fixed terminal such as a control terminal may provide for a mechanism to update the direct mode subscriber units with new program settings, channels, groups, etc.

Wireless communication systems may operate according to an industry standard protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Communications in accordance with any one or more of these standards, or other standards, may take place over physical channels in accordance with one or more of a TDMA (time division multiple access), FDMA (frequency divisional multiple access), or CDMA (code division multiple access) protocol. Subscriber units in wireless communication systems such as those set forth above send user communicated speech and data, herein referred to collectively as 'traffic information', in accordance with the designated protocol.

Many so-called "public safety" wireless communication systems provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force.

However, situations may arise where a particular radio user may wish to subscribe or participate in more than one group. In the past, this possibility has been provided through features such as scan lists that allow a radio user to configure their radio with a set of groups in which they are interested or subscribed, and the radio then scans each of the groups for communications and, when found, tunes to and receives communications associated with one of the particular groups. Situations may arise, however, that do not allow time for a user to configure his or her radio to scan particular groups. Additionally, pre-provisioned group IDs (e.g., identifiers that may be used to differentiate groups and as destination addresses for communications directed to group members) and group aliases (e.g., alphanumeric identifiers that may be associated with respective group IDs) associated with the groups may not be generally descriptive of a particular incident being responded to or function being performed by the group of radio users, and thus a new radio user on a scene may not know what group and/or channel to tune its radio to without transmitting on each channel and/or group to discover its use, wasting channel bandwidth and preventing effective use of the channel and/or group for emergency purposes. Furthermore, changes to the radio made by the radio user are permanently stored at the radio, and do not generally allow for temporary and/or continuous changes or updates to the radio's group membership or descriptive group names by a remote entity such as a system console. Finally, in those instances where group transmissions are being recorded or stored to preserve the contents of conversations during an incident, it may become difficult to discern which radio group's have responded to a particular incident, and difficult to locate particular desired transmissions when multiple different groups are responding to a same particular incident.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
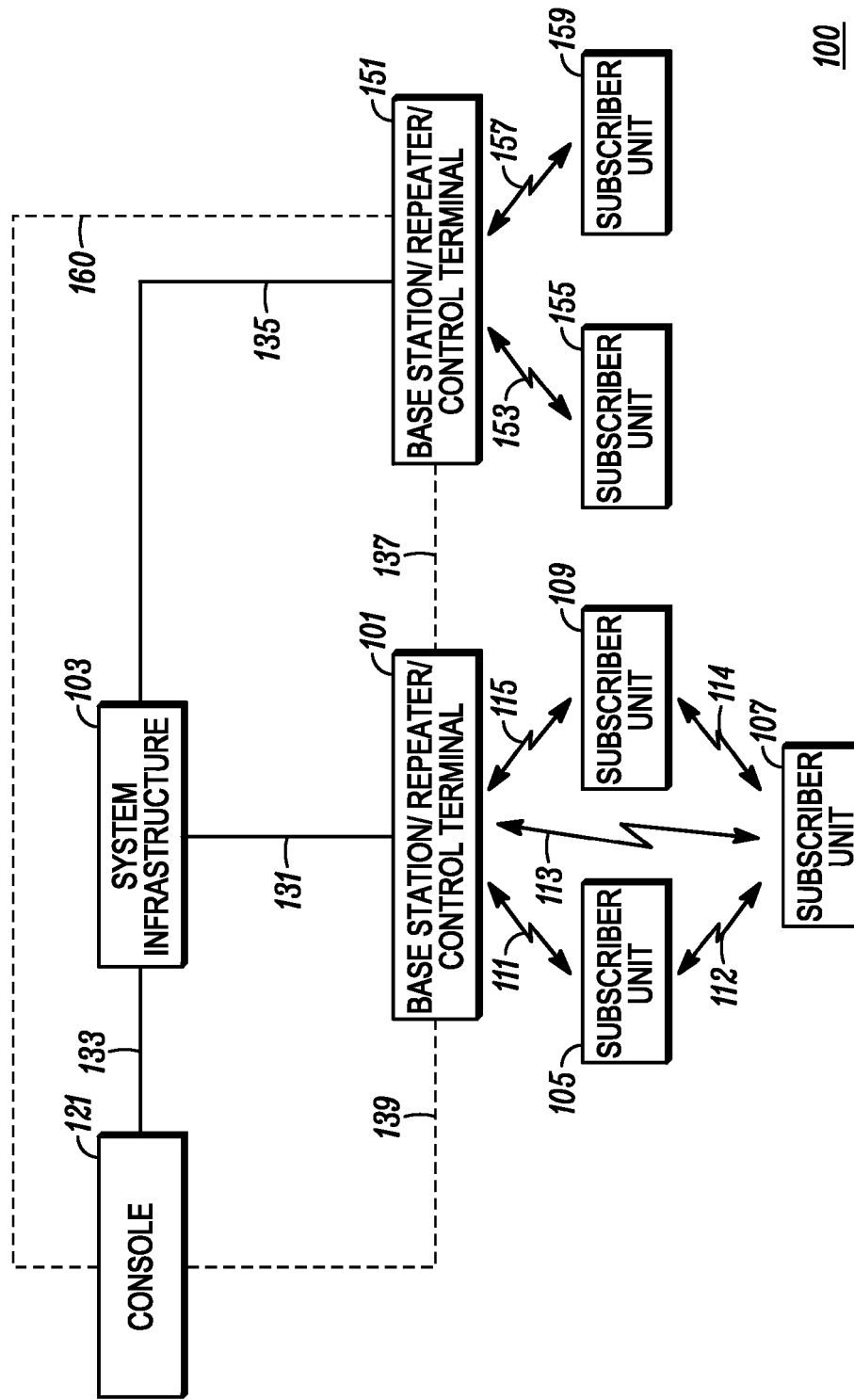
FIG. 1 is a schematic diagram of a wireless communication system in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

In light of the foregoing, it would be advantageous to provide for a system and method that allows an updated text-based group alias that describes one or more of a location, purpose, and function of a particularly assigned group ID (associated with a particular group) to be temporarily assigned to members of the group and used to replace a stored group ID or stored group alias with which the received group alias is associated. The updated group aliases could be dynamically assigned by a console operator in the wireless network, and when present and received in a communication to a subscriber unit, used by the subscriber unit to temporarily replace an internally and statically stored group ID or stored group alias already associated with the group, without overwriting or otherwise deleting the internally and statically stored group ID or stored group alias, the stored group ID of which is still used to transmit and receive communications with the group. Furthermore, it would be advantageous to provide for a system and method that allows an incident ID to be assigned to a plurality of groups that are responding to a particular incident, such that, upon request and without further modification or configuration by a user of the subscriber unit, the subscriber unit may scan all groups that are associated with the dynamically provided incident ID by scanning for any communications having the indicated incident ID embedded therein, separate and apart from group IDs.

More specifically, the present disclosure sets forth, in a two-way radio frequency (RF) communications system having at least one fixed terminal, a plurality of channels, and a plurality of subscriber units, a first subscriber unit monitoring, on a first channel, for communications of a first group associated with a first group ID stored at the first subscriber unit to which the first subscriber unit is subscribed. Subsequently, the first subscriber unit receives an updated group alias assign message, addressed to the first group, instructing radios subscribed to the first group to temporarily use the updated group alias that describes one or more of a location, purpose, and function of the first group for a temporary period of time in place of the first group ID and/or a stored first group alias associated with the first group ID. The first subscriber unit then displays, on a display of the first subscriber unit, the updated group alias, instead of the stored first group ID and/or stored first group alias, during subsequent communications with the first group. Furthermore, and responsive to one of a detected user input, updated group alias un-assign message, and a first subscriber unit detected trigger, the first subscriber unit reverts to the stored first group ID and/or stored group alias and, during subsequent communications with the first group, refrains from displaying the updated group alias.

Additionally, the present disclosure sets forth, in a two-way radio frequency (RF) communications system having at least one fixed terminal, a plurality of channels, and a plurality of subscriber units, a first subscriber unit that monitors, on a first channel, for communications of a first group associated with a first group ID stored at the first subscriber unit to which the first subscriber unit is subscribed. The first subscriber unit then receives an incident ID assign message, addressed to one of the first group and the first subscriber unit, instructing the first subscriber unit that it is temporarily assigned to a particular incident and identifying the incident with an incident ID. The first subscriber unit then begins embedding the incident ID into one or more subsequent transmissions so that transmissions associated with the incident may be identified by other subscriber units and by any infrastructure devices recording the transmissions for future reference. Responsive to receiving an incident ID scan instruction, the first subscriber unit starts an incident ID scan process, including scanning a plurality of pre-configured channels and/or groups for communications that include an embedded incident ID that matches the received incident ID. If a communication is detected on a particular one of the plurality of pre-configured channels and/or groups including an embedded incident ID that matches the received incident ID, the first subscriber unit tunes to the particular one of the plurality of pre-configured channels and/or groups. Responsive to one of a detected user input, received incident ID un-assign message, and a first subscriber unit detected trigger, the first subscriber unit halts the incident ID scan process and/or refrains from embedding the incident ID into subsequent transmissions initiated at the first subscriber unit.

By assigning updated group aliases and incident IDs in the manner set forth above, radio users joining an area and scanning or re-scanning for a desired group can be aided with updated group alias text that describes one or more of a location, purpose, and function of a first group for a temporary period of time, while still retaining the pre-provisioned group ID and/or group alias at the subscriber unit associated with the first group. Furthermore, multiple groups of radios can be dynamically assigned to a temporary incident ID so that, when necessary, radio users can monitor and/or transmit to groups assigned to other functions or functional units at a particular incident without having to configure or reconfigure their radios manually and without having to manually modify scan lists or group subscriptions already configured at the radio.

Each of the above-mentioned embodiments will be discussed in more detail below, starting with example network and device architectures of the system in which the embodiments may be practiced, followed by a discussion of group alias updates and then incident ID updates. Further advantages and features consistent with this disclosure will be set forth in the following detailed description, with reference to the figures.

I. Network and Device Architectures

FIG. 1 shows a wireless communication system 100 which may be adapted in accordance with an embodiment of the disclosure. It will be apparent to those skilled in the art that the system 100 and the components which are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, or the TETRA standard, among other possibilities.

The system 100 shown in FIG. 1 includes one or more fixed terminals (e.g., base stations/repeaters/control terminals) (BSs) 101, 151, which may be operably connected to a system infrastructure 103 via respective wired or wireless links 131, 135. While the term BS will be used to refer to the fixed terminal 101, for each of reference, it should be noted that the fixed terminal 101 may, in some embodiments, be a repeater or a control terminal. The BS 101 has radio links with a plurality of subscriber units, particularly subscriber units (SUs) in a service cell or site at least partially defined by a geographic location of the BS 101. In addition to SUs, BS 101 may maintain a direct wireless or wired link 139 (or indirect via system infrastructure 103) with a dispatch console 121 or other operator. The dispatch console 121 may be configured to act as a communications client of BS 101, but may also provide administrator control access to BS 101 so that an administrator may update operational parameters at BS 101, including defining updated group aliases and incident IDs (and perhaps associated incident ID aliases) for use or monitoring by BS 101. Three SUs 105, 107, 109 are illustrated in FIG. 1 as being within the service area of, and being registered with, BS 101 via respective radio links 111, 113, 115. In one embodiment, the BS 101 serves SUs including the SUs 105, 107, 109 with radio communications to and from other terminals, including (i) SUs served by the BS 101, (ii) SUs served by other BSs such as BS 151, (iii) other terminals including SUs in other systems (not shown) operably linked to the system 100 via the system infrastructure 103, and (iv) the console 121. In another embodiment in which SUs 105, 107, 109 are operating in a direct communication mode (DCM) via example radio links 112, 114, BS 101 may simply be a control terminal that may be used to provide updated group aliases and/or incident IDs (and perhaps associated incident ID aliases) to DCM SUs 105, 107, 109.

BS 151 similarly has radio links with a plurality of SUs, particularly SUs in a service cell or site at least partially defined by a geographic location of the BS 151. In addition to SUs, BS 151 may maintain a direct wireless or wired link 160 (or indirect via system infrastructure 103) with the dispatch console 121 or other operator. The dispatch console 121 may be configured to act as a communications client of BS 151, but may also provide administrator control access to BS 151 so that an administrator may update operational parameters at BS 151, including defining updated group aliases and incident IDs (and perhaps associated incident ID aliases) for use or monitoring by BS 101. Two SUs 155, 159 are illustrated in FIG. 1 as being within the service area of, and being registered with, BS 151 via respective radio links 153, 157. The BS 151 thereby serves SUs including the SUs 155, 157 with radio communications to and from other terminals, including (i) SUs served by the BS 151, (ii) SUs served by other BSs such as BS 101, (iii) other terminals including SUs in other systems (not shown) operably linked to the system 100 via the system infrastructure 103, and (iv) the console 121. In another embodiment, although not shown, SUs 155, 159 may similarly operate in a DCM, and BS 151 may simply be a control terminal that may be used to provide updated group aliases and/or incident IDs (and perhaps associated incident ID aliases) to DCM SUs 155, 159.

The system infrastructure 103 includes known sub-systems (not shown) required for operation of the system 100. Such sub-systems may include for example sub-systems providing authentication, routing, SU registration and location, system management and other operational functions within the system 100. The system infrastructure 103 may also provide routes to other BSs (not shown) providing cells serving other SUs, and/or may provide access to other types of networks such as a plain old telephone system (POTS) network or a data-switched network such as the Internet. The system infrastructure 103 may also maintain a separate link 133 to the console 121 for supporting voice calls to and from the console 121 and/or for allowing configuration of network elements such as BSs 101, 151 within the system infrastructure 103 from the console 121.

Figure 2:
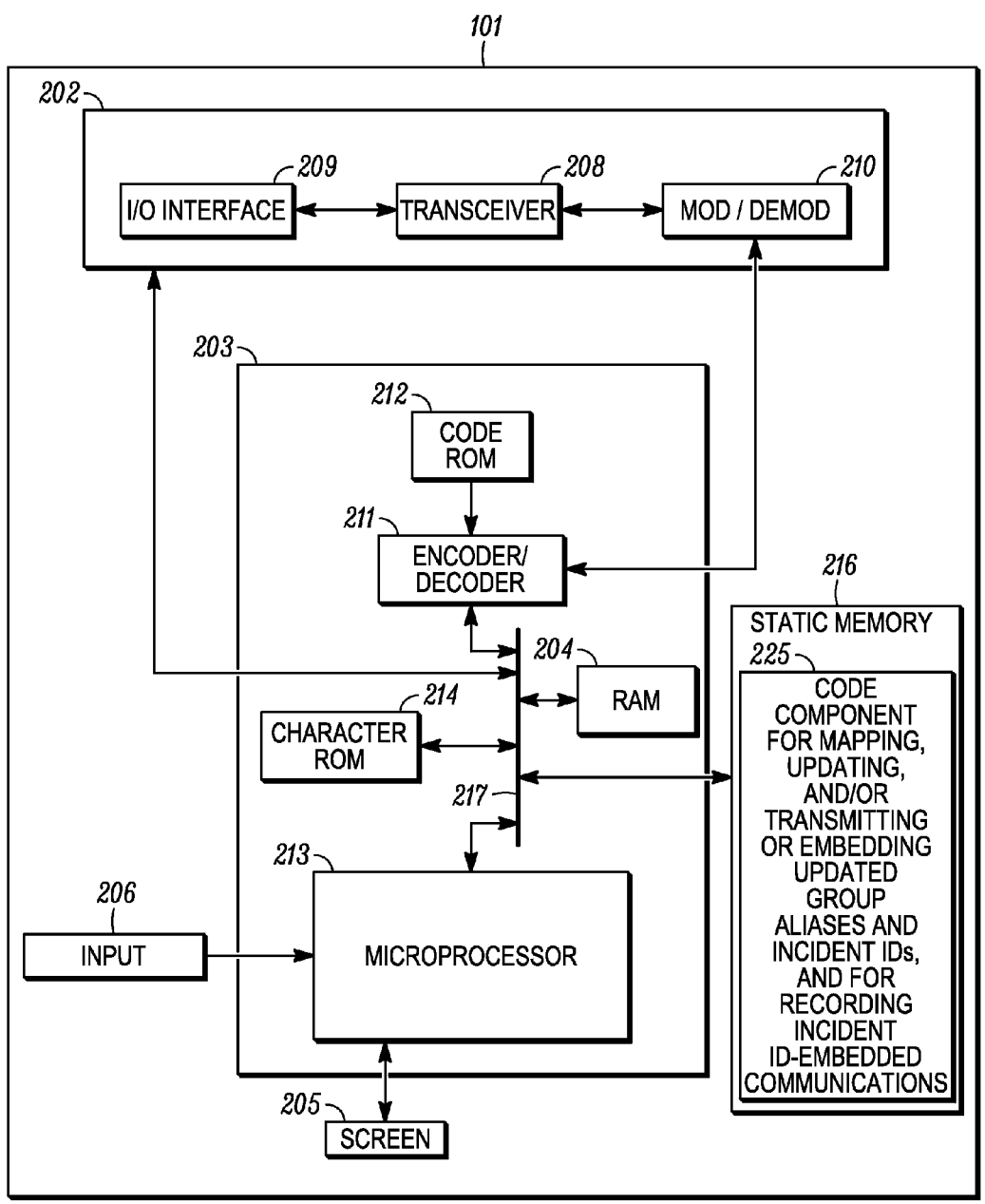
FIG. 2 is a block diagram of an illustrative layout of a base station/repeater of the system of FIG. 1.

FIG. 2 is an example functional block diagram of a BS such as BS 101 operating within the system 100 of FIG. 1 in accordance with some embodiments. Other BSs such as BS 151 may contain same or similar structures. As shown in FIG. 2, BS 101 includes a communications unit 202 coupled to a common data and address bus 217 of a processing unit 203. The BS 101 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals that may be transmitted or received between other BSs or SUs in the same radio site as BS 101, or perhaps between other BSs in a remote radio site such as BS 151. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with SUs such as SUs 105, 107, 109, with other BSs such as BS 151, with the system infrastructure 103, and/or with the console 121. The communications unit 202 may include one or more wireless transceivers 208, such as a DMR transceiver, an APOCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding data such as control channel messages and/or data or voice messages that may be transmitted or received by the BS 101. Static memory 216 may store operating code for the microprocessor 213 that, when executed, maps, updates SUs, records incident ID-tagged communications, and/or transmits or embeds updated group aliases, incident IDs, and/or incident ID aliases into communications with SUs in accordance with one or more of FIGS. 5-10 and corresponding text. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 3:
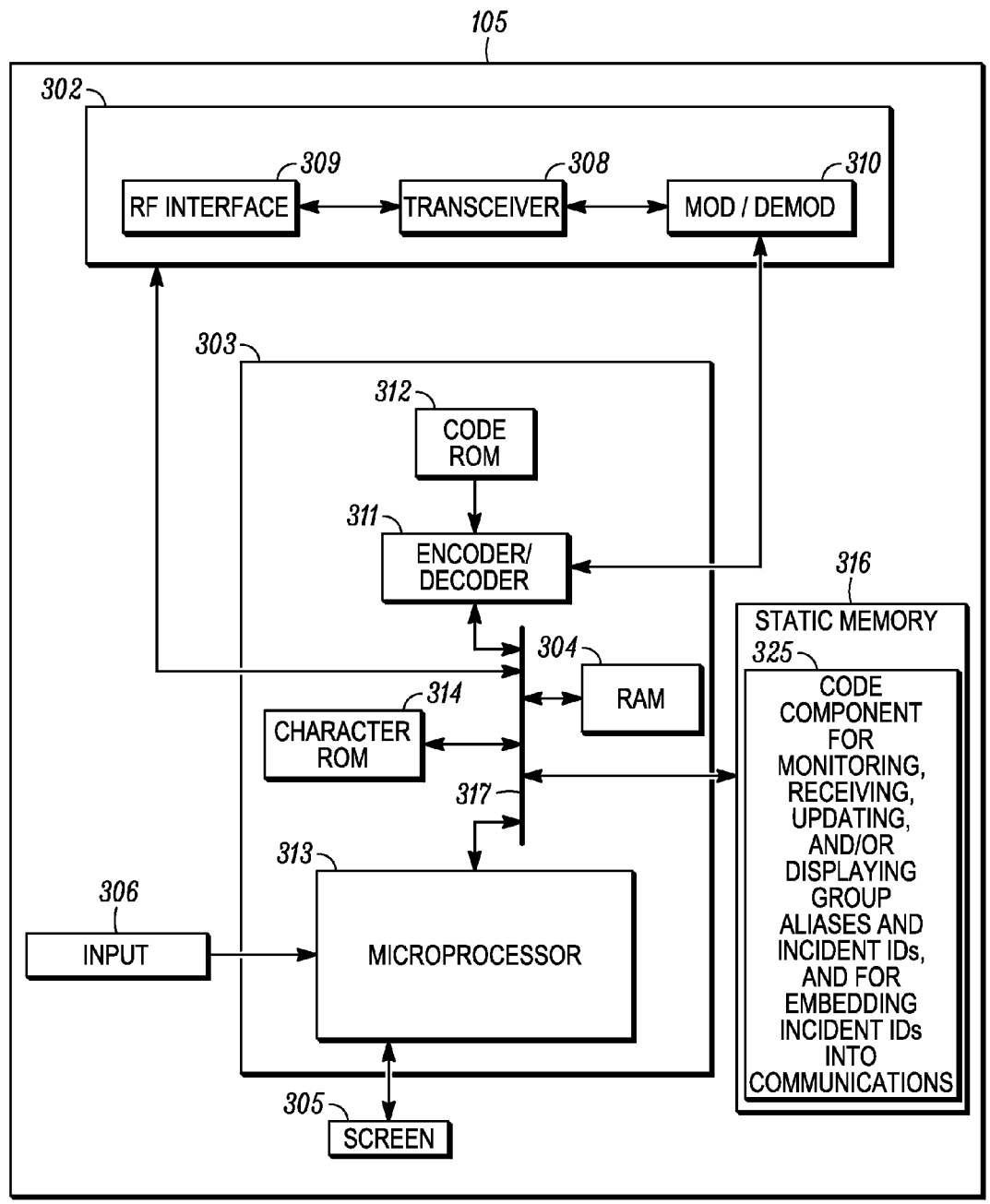
FIG. 3 is a block diagram of an illustrative layout of a subscriber unit of the system of FIG. 1.

FIG. 3 is an example functional block diagram of a SU such as SU 105 operating within the system 100 of FIG. 1 in accordance with some embodiments. Other SUs such as SUs 107, 109, 155, and 157 may contain same or similar structures. As shown in FIG. 3, SU 105 includes a communications unit 302 coupled to a common data and address bus 317 of a processing unit 303. The SU 105 may also include an input unit (e.g., keypad, pointing device, etc.) 306 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received between other BSs or SUs in the same radio site as BS 101, or perhaps between other BSs in a remote radio site. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include an RF interface 309 configurable to communicate with other SUs such as SUs 107, 109, 155, 157 and with BSs such as BSs 101, 151. The communications unit 302 may include one or more wireless transceivers 308, such as a DMR transceiver, an APOCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as control channel messages and/or data or voice messages that may be transmitted or received by the SU 105. Static memory 316 may store operating code for the microprocessor 313 that, when executed, monitors, receives, displays, and/or updates group aliases and/or incident IDs (and perhaps incident ID aliases) and that embeds incident IDs into communications with BSs or other SUs in accordance with one or more of FIGS. 5-10 and corresponding text. Static memory 316 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

FIGS. 4A-4D set forth examples of conventional and trunked radio system that may be implemented between the BSs and SUs of FIG. 1, in accordance with some embodiments. In the conventional radio system 401 of FIG. 4A, a plurality of subscriber units 410-426 are formed into groups (A, B, and C, which may be talkgroups, data groups, broadcast groups, multi-cast groups, etc.). Each group uses an associated channel (shared or separate) for communication. Thus, each group is associated with a corresponding channel, and each channel can only be used by one group at any particular moment in time. Channels may be divided by frequency (FDMA), time (TDMA), and/or code (CDMA). As illustrated, SUs 1-3 (410-414) are in talk group A and communicate on channel CH 1 402, while SUs 4-7 (416-422) are in talk group B and communication on channel CH 2 404 and SUs 8-9 (424-426) are in talk group C and communicate on channel CH 3 406. In other systems, multiple groups may operate on the same channel, and may use a unique group ID embedded in the group communications to differentiate them.

Figure 4A:
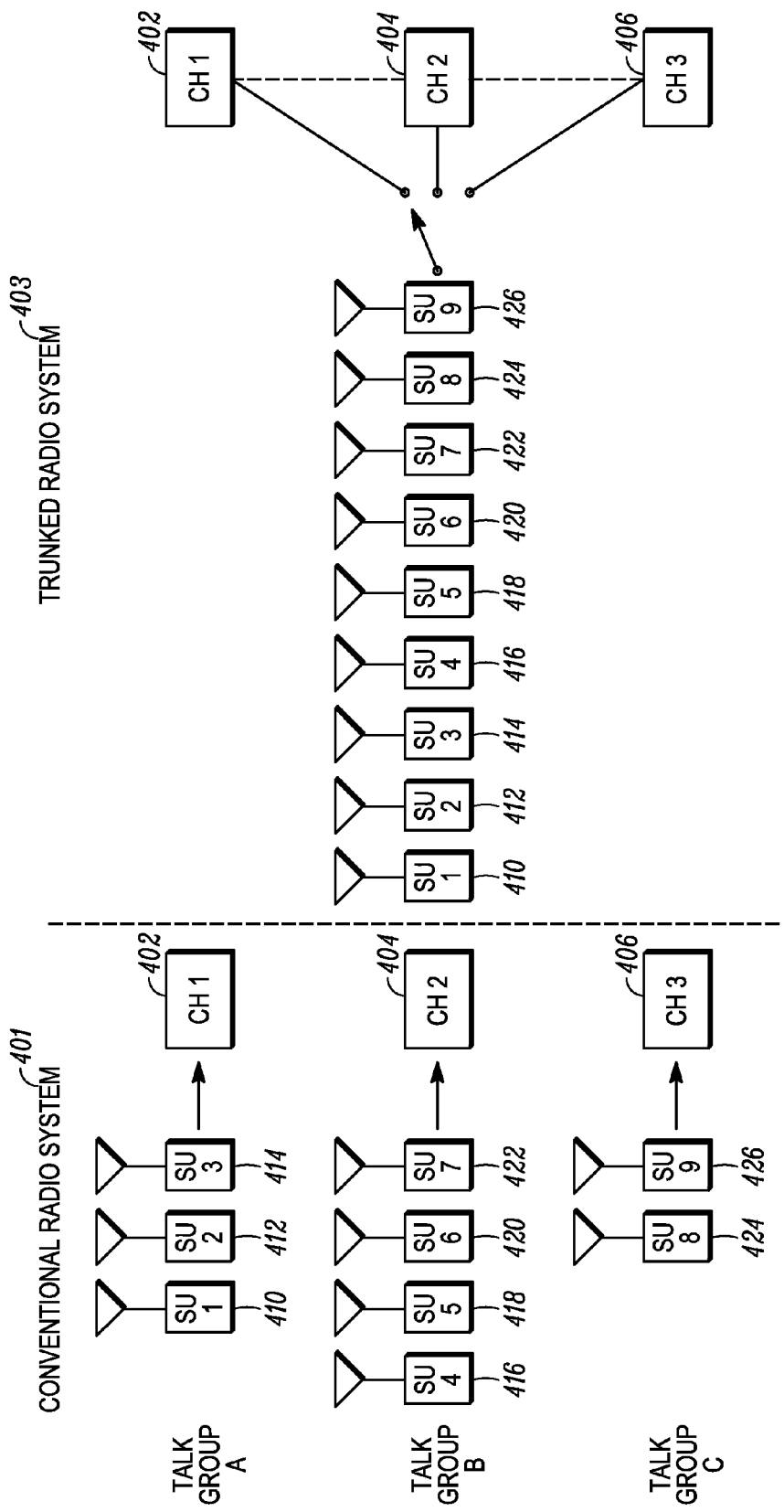
FIGS. 4A-4D are block diagrams illustrating a conventional radio system and a trunked radio system that may be implemented in the system of FIG. 1.

In contrast, in the trunked radio system 403 of FIG. 4A, SUs 1-9 410-426 use a pool of channels for virtually an unlimited number of groups. Thus, all groups are served by all channels. The trunked radio system 403 works to take advantage of the probability that not all groups need a channel for communication at the same time. For a traffic load, fewer channels are required since all groups are served by all channels. FIGS. 4A-4D provide examples of a trunked radio channel switching that may be implemented at a BS such as BS 101. Two trunking examples will be described with respect to FIGS. 4A-4D, including a first example in which SUs idling on an initial designated rest channel are assigned a new traffic channel for a new group call while remaining SUs stay on the initial designated control channel (also known as a rest channel), and a second example in which SUs idling on an initial designated control channel remain on the initial designated control channel (which is converted to a traffic channel for the new group call) while remaining SUs not participating in the new call move to a new designated control channel different from the initial designated control channel.

As shown in FIG. 4A, an initial configuration of a trunked radio site 403 may include three channels CH1 402, CH2 404, and CH3 406. Each of the channels CH1-CH3 (402-406) may correspond to a separate base station at a co-located site (generally identified, as a group, as BS 101 in FIG. 1, for example). Also included in trunked radio site 403 is SUs SU1 410-SU9 426. Initially, it is assumed that CH1 402 is designated the control channel (e.g., the channel on which idle SUs are to tune to for new group call information, and which may be identified by a unique synchronization pattern or unique message detectable or retrievable by the SUs).

Figure 4B:
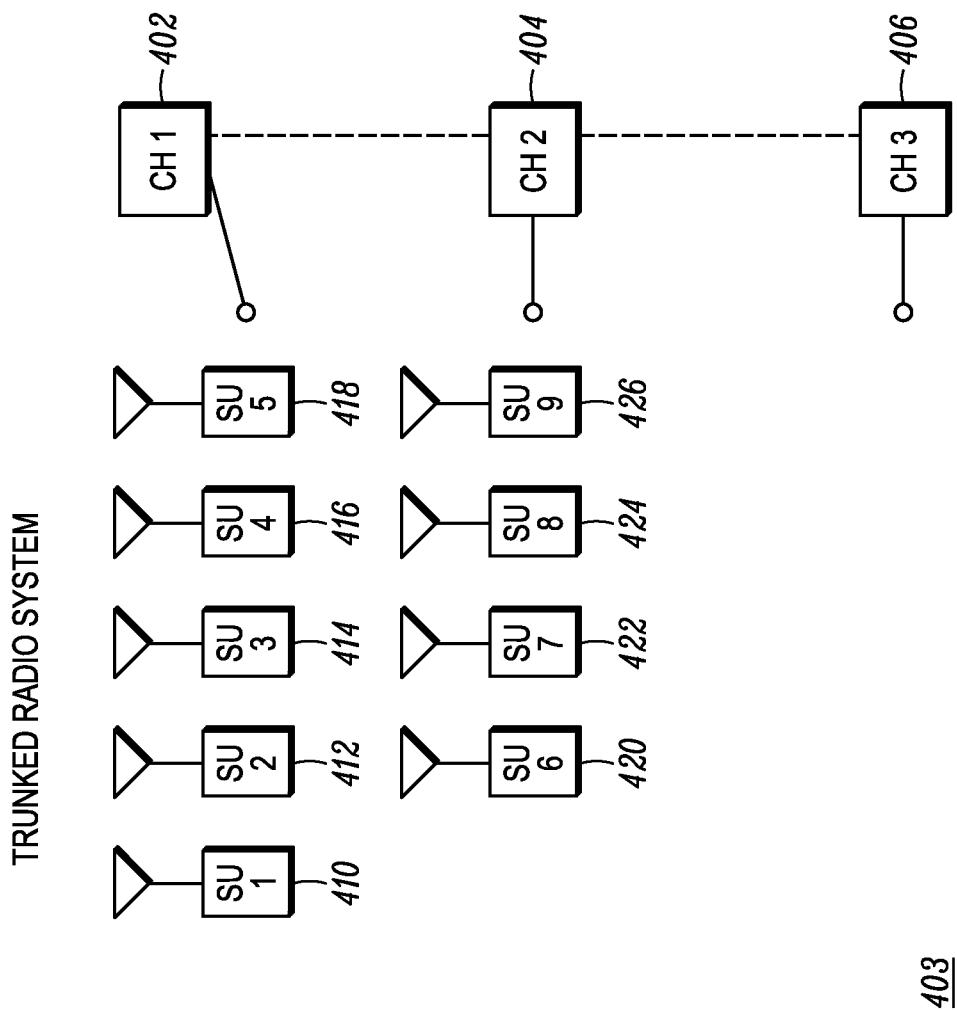

In any event, and as shown in FIG. 4A, all SUs SU1 410-SU9 426 initially detect channel CH1 as the control channel and idle on control channel CH1. At some point in time, let us assume that SU6 420 transmits a new call request on control channel CH1 402. The base station corresponding to control channel CH1 402 may receive the new call request, determine that CH2 404 is idle and available to handle the new call, and assign the new group call to CH2 404. An announcement is then made on CH1 402 instructing all SUs interested in participating in the new group call to move to the newly assigned traffic channel CH2 404. As shown in FIG. 4B, SUs SU6 420-SU9 426 have moved to the new traffic channel CH2 404 to participate in the new call. Meanwhile, SUs SU1 410-SU5 418, which are not participating in the new call, remain on the initial control channel CH1 402.

Figure 4C:
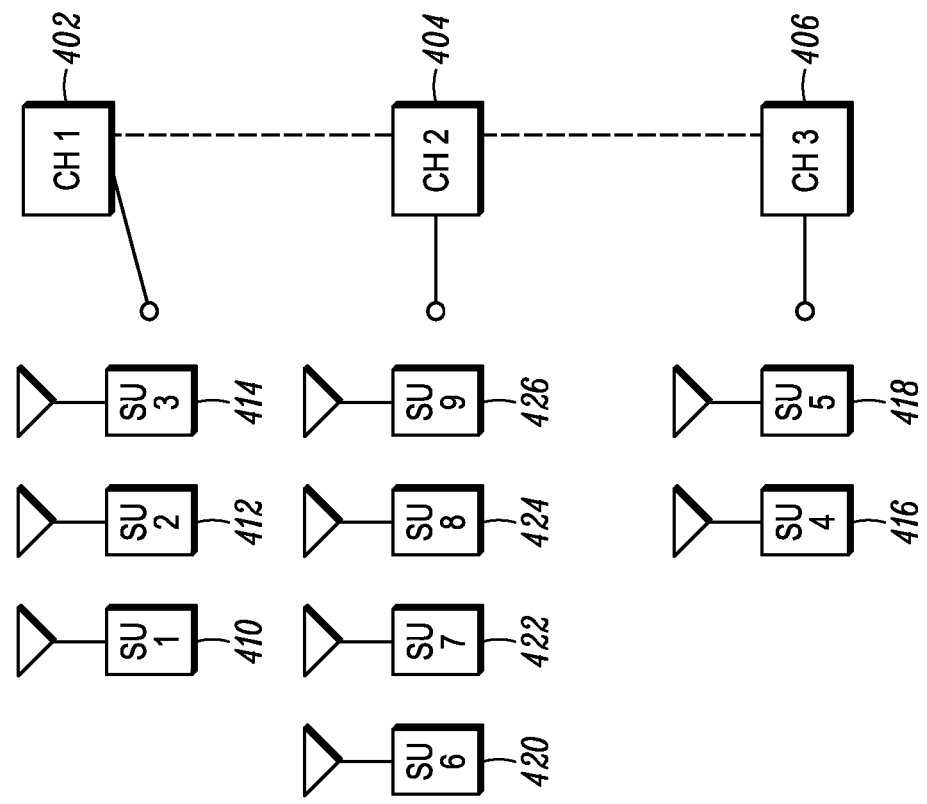

Let us further assume that at some future point in time SU4 416 transmits a second new call request on control channel CH1 402. The base station corresponding to control channel CH1 402 may receive the new call request, determine that CH2 404 is busy but that CH3 406 is idle and available to handle the second new call, and assign the second new call to CH3 406. An announcement is then made on CH1 402 instructing all SUs interested in participating in the second new call to move to the newly assigned traffic channel CH3 406. As shown in FIG. 4C, SUs SU4 416-SU5 418 have moved to the new traffic channel CH3 406 to participate in the new call. Meanwhile, SUs SU1 410-SU3 414, which are not participating in the second new call, remain on the initial control channel CH1 402.

Figure 4D:
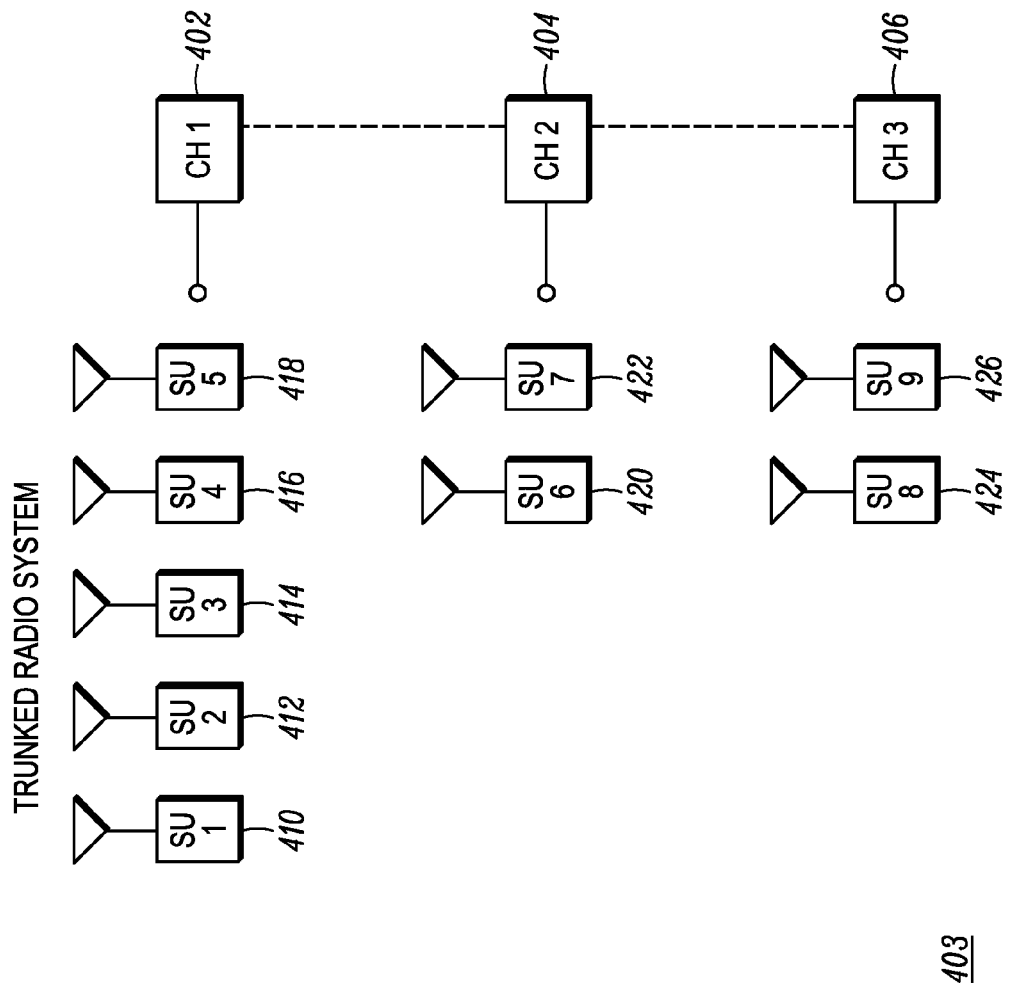

In an alternative way of assigning channels in a trunked radio system, FIGS. 4A-4B will be relied upon again, but described in a slightly different matter, and FIG. 4D will be relied upon instead of FIG. 4C. As again shown in FIG. 4A, initially, it is again assumed that CH1 402 is designated the current control channel at trunked radio site 403, and all SUs SU1 410-SU9 426 initially detect and idle on control channel CH1. At some point in time, let us again assume that SU1 410 transmits a new call request on channel CH1 402. In this case, the control channel CH1 (assuming it is idle) is automatically assigned as the traffic channel for the new group call. Those SUs wishing to participate in the new group call remain on the control channel (e.g., now a traffic channel for the new call), and the remaining SUs search out a new control channel, are instructed by the BS corresponding to channel CH1 402 what the new control channel will be, or perform some other action to determine where to locate the new control channel. As shown in FIG. 4B, SUs SU1 410-SU5 418, which are participating in the new group call, remain on the designated control channel CH1 402 (e.g., now a traffic channel). SUs SU6 420-SU9 426, meanwhile, have moved to a new control channel CH2 404 to listen for subsequent new group call notifications.

Let us further assume that at some future point in time SU6 420 transmits a second new group call request on current control channel CH2 404. In this case, the current control channel CH2 404 is automatically assigned as the traffic channel for the second new group call. Those SUs wishing to participate in the second new group call remain on the current control channel CH2 404 (e.g., now a second traffic channel), and the remaining SUs search out a new control channel, are instructed by the base station corresponding to channel CH2 404 what the new control channel will be, or perform some other action to determine where to locate the new control channel. As shown in FIG. 4D, SUs SU6 420-SU7 422, which are participating in the second new group call, remain on the current control channel CH2 404 (e.g., now the second traffic channel). SUs SU8 424-SU9 426, meanwhile, have moved to a new control channel (in this example, channel CH3 406) to listen for subsequent new group call notifications.

Other examples of trunked radio site channel distribution and assignment are possible as well. Furthermore, although only three channels are illustrated in FIGS. 4A-4D, the same concepts can be applied to any number of available channels and/or base stations.

II. Group Alias Updates

Figure 5:
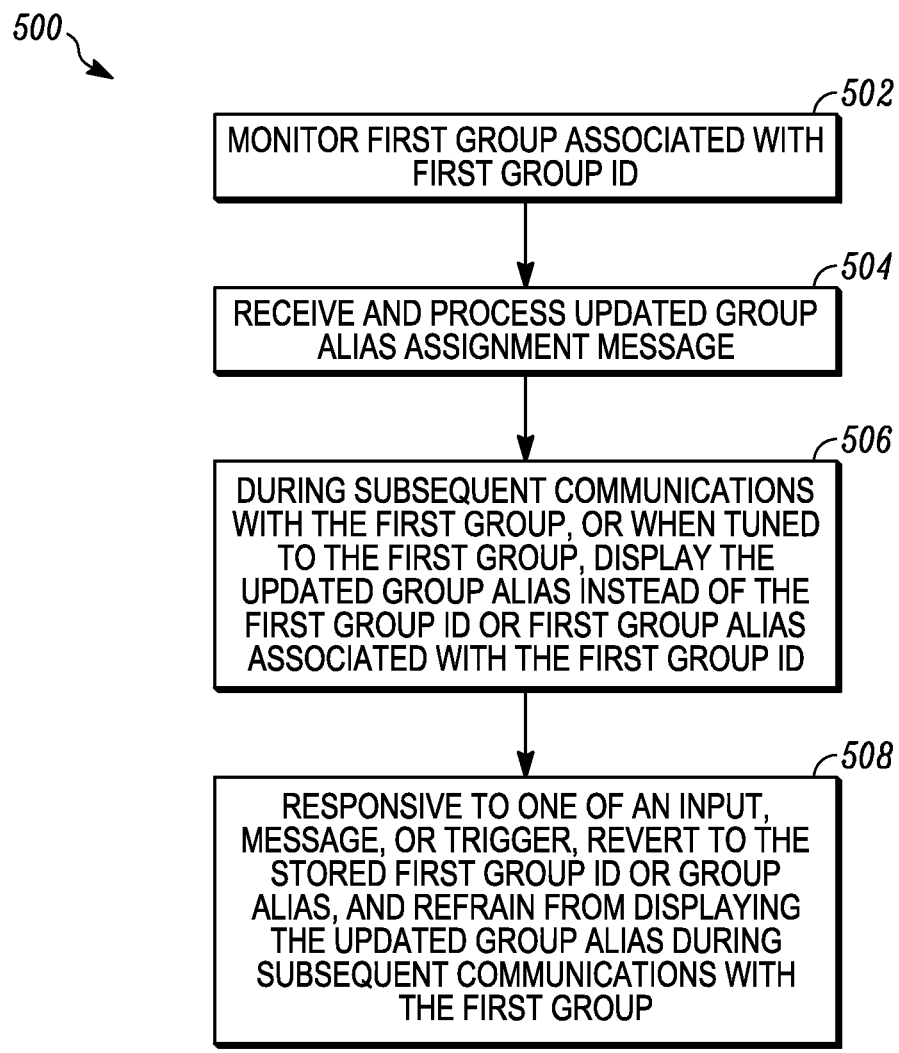
FIG. 5 is a flowchart illustrating a process used by a subscriber unit to receive, process, and temporarily store an updated group alias in accordance with an embodiment of the present disclosure.

FIG. 5 is a flowchart illustrating a process 500 used by a SU to receive, process, temporarily store, and display an updated group alias in accordance with an embodiment of the present disclosure. At step 502, a SU monitors a first group with which it is associated and/or subscribed for communications directed to the first group. The SU could be operating in a conventional or trunked radio system in accordance with FIGS. 4A-4D. The SU may be configured via a codeplug configuration tool or software, a user selection via an input interface, or over-the-air via a BS such as BS 101 with one or more group IDs associated with subscribed groups. A codeplug is a solid-state (fixed or removable) chip located inside the radio where the radio's parameters are stored.

A group ID may be, for example, a 1 to 4-byte numeric ID that is unique to each group in a particular radio system. Communications directed to the particular group may then include the particular group's associated group ID in a destination address field of a voice or data communication that is intended for receipt by all group members (e.g., those radios subscribed to that group, perhaps among additional subscribed groups as well). In a conventional radio system such as radio system 401 in FIG. 4A, a SU may monitor the particular group on the channel on which it is assigned for all communications on that channel, or only for communications that include the particular group's group ID. If the SU is subscribed to multiple groups, it may implement a scan system in which it scans multiple channels (each associated with one or more particular groups) for communications, and once a particular channel having communications associated with a subscribed group is located, the scanning process is temporarily halted for the duration of the call.

In a trunked radio system such as radio system 403, a SU may monitor a designated control channel (e.g., a rest channel) for new call notifications associated with any one or more groups to which it is subscribed. For example, a particular SU may be previously configured (by codeplug, by user selection, or over-the-air) to be subscribed to groups A and B, and may monitor the rest channel for new call notifications including a group ID associated with groups A or B.

At step 504, the SU receives and processes an updated group alias assignment message transmitted to the first group. In order to ensure that all radios subscribed to a group have received the updated group alias, an infrastructure device such as the BS 101 or console 121 of FIG. 1 may be configured to cause the updated group alias assignment message to be repeatedly and/or periodically transmitted to the group (e.g., once every 60 ms-10 minutes). While processing the message at step 504, the SU determines whether the received updated group alias assignment message references one or more group IDs that match a pre-configured group ID at the SU (e.g., whether the group ID included in the updated group alias message references a group that the SU is currently subscribed to and thus matches a stored group ID at the SU). Group IDs may be stored at the SU in a static memory such as static memory 316 in FIG. 3, in a code plug of the SU, or in some other non-volatile manner.

Figure 6:
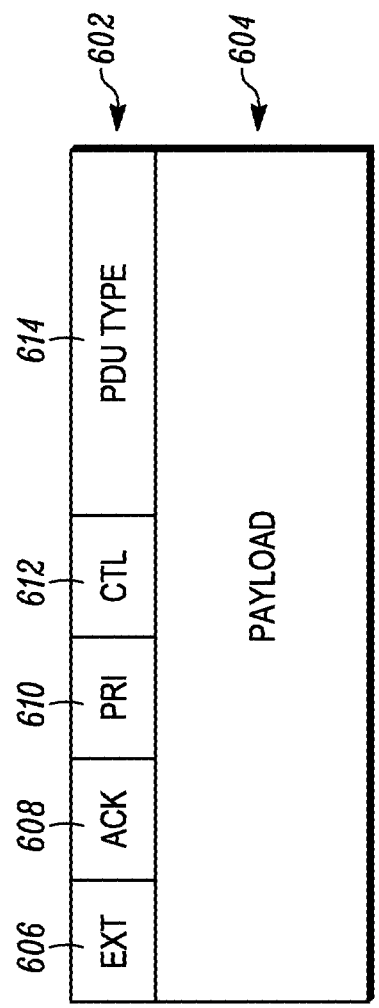
FIG. 6 is a block diagram illustrating an example header structure that may be transmitted by a fixed terminal (base station/repeater/control terminal) to a subscriber unit to assign or unassign an updated group alias or incident ID to a subscriber unit in accordance with an embodiment of the present disclosure.
Figure 7:
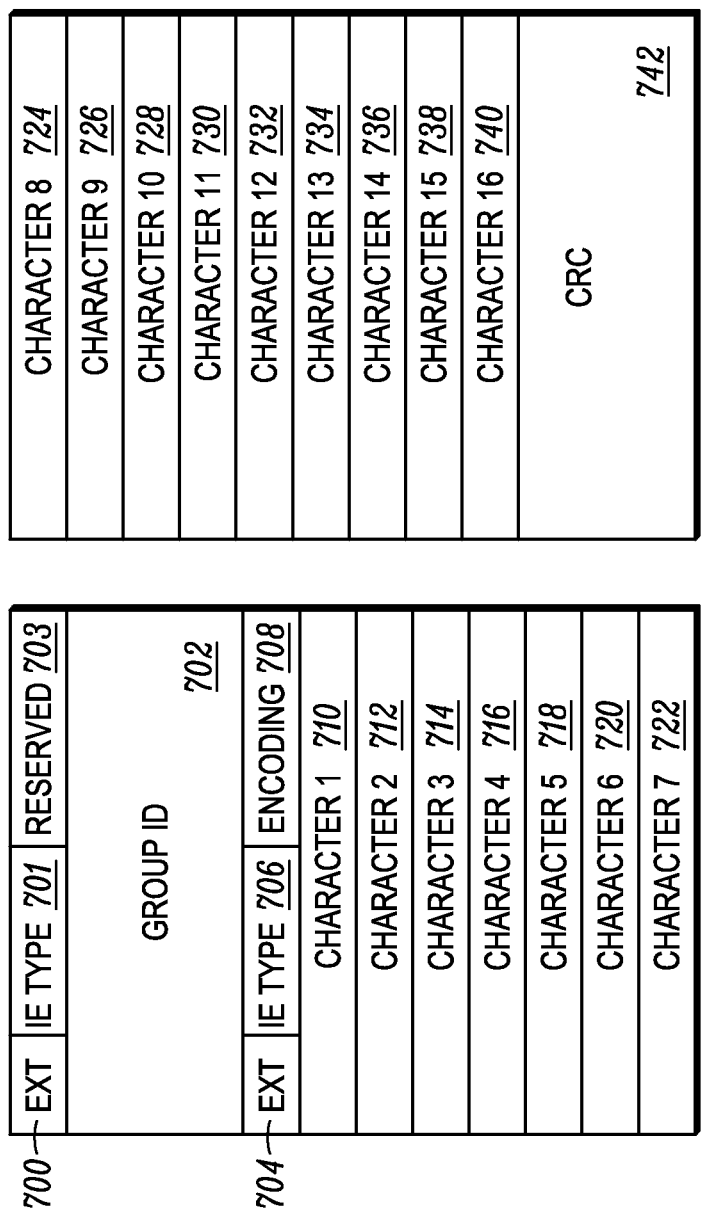
FIG. 7 is a block diagram illustrating an example PDU data structure accompanying the header structure of FIG. 6 that may be transmitted by a fixed terminal (base station/repeater/control terminal) to a subscriber unit to assign or unassign an updated group alias to a subscriber unit in accordance with an embodiment of the present disclosure.

FIGS. 6 and 7 illustrate an example of an updated group alias assignment message that may be used to temporarily assign an updated group alias to a group ID in accordance with some embodiments. FIG. 6 illustrates a general structure of a message header portion 602 that may be used to signal an updated group alias assignment or unassign message and accompanying updated group alias assignment payload 604, and FIG. 7 sets forth a detailed example of the updated group alias assignment payload 604. The message header portion 602 of FIG. 6 may be part of a larger or other header structure, such as for example a packet data header, a voice header, a privacy header, a compressed UDP/IP header, or some other header. If not combined with a larger or other header, portions of the payload 604 may be populated (e.g., shifted from) the structures illustrated in FIG. 7 to fill a full 12-byte frame. Additional, optional, padding may be added as necessary in a last frame to complete the last 12-byte frame.

The message header portion 602 includes a header extension field 606, an acknowledgment field 608, a priority field 610, a control bit field 612, and a PDU type field 614. The header extension (EXT) field 606 is a one-bit field that is used for expanding the number of PDUs in a transmission as necessary for including additional protocol or payload information. Thus, a string of PDU's may comprise two or more headers and accompanying payloads depending on the setting of one or more header extension fields 606. The acknowledgment (ACK) field 608 is a one-bit field used for indicating that an acknowledgment message is required from a receiving device. However, if the message type is an acknowledgement message, then this indicates a negative acknowledgment (NACK) when this field is set.

The priority (PRI) field 610 is a one-bit field that works to flag the message as a priority-based communication. The control bit (CTL) field 612 is a one-bit field used to designate either control or user-based information (or in other words whether the PDU is a control message or a user message). The PDU type field 614 is a four-bit field used to designate a type of PDU. This may include such message types as assign, updated group alias assign, incident ID assign, incident ID alias assign, unassign, updated group alias unassign, incident ID unassign, incident ID alias unassign, or a combination of assign instructions or unassign instructions. In an embodiment, the PDU type field 614 may be used in combination with one or more fields in the payload 604 to designate a particular mix of functions, as will be discussed in more detail below.

FIG. 7 illustrates the payload portion 604 of an updated group alias assignment message in accordance with some embodiments. As set forth in FIG. 7, the payload portion 604 of the updated group alias assignment message may include a Group ID field 702, extension fields (EXT) 700, 704, information element (IE) type fields 701, 706, a reserved field 703, an encoding field 708, a plurality of encoded character fields 710-740, and a cyclic redundancy check (CRC) field 742.

Group ID field 702 identifies a group ID to which an updated group alias assignment message is being assigned or associated. Although group ID field 702 is shown in FIG. 7 as including only a single group ID, in other embodiments, more than one group ID may be included in group ID field 702, and/or more than one group ID field 702 may be present in a particular updated group alias assignment or unassign message, and successive sets of character fields 710-740 assigned, in order, to each of the group IDs included in group ID field(s) 702. Thus, any SU that is subscribed to at least one group ID included in the group ID field 702 processes the received updated group alias assignment message and associates the respective updated group alias(es) with at least the corresponding group ID(s) indicated in the group ID field 702 and to which the SU subscribes. If the SU is associated with a plurality of the group IDs, it may update all of the aliases at one time, independent of the channel or group on which the updated group alias assignment message was received.

Returning to the example of FIG. 7, the group ID may be a 3-byte field and thus provides for the ability to uniquely identify approximately $2^{24}$ unique groups. Other group ID encodings and lengths could also be used, for example 8 bits, 12 bits, or 16 bits.

Extension fields 700, 704 are similar to the extension field 606, and indicates whether further Information Elements (e.g., defined by an associated IE type field) are to be transmitted. For example, the EXT field 700 may be set to indicate that a further IE is coming (see field 706), and EXT field 704 may indicate that no further IEs are coming.

The IE type fields 701, 706 may be used, by themselves or in combination with the PDU type field 614 in the header portion 602, to designate a type of PDU. As set forth earlier, this may include such message types as assign, updated group alias assign, incident ID assign, incident ID alias assign, unassign, updated group alias unassign, incident ID unassign, incident ID alias unassign, or a combination of assign instructions or unassign instructions. For example, the PDU type field 614 may be used to indicate whether the PDU is an assign or unassign instruction, and the IE type fields 701 and/or 706 used to indicate whether an updated group alias alone is being assigned or unassigned, an incident ID is being assigned or unassigned, an incident ID alias is being assigned or unassigned, or a combination of updated group alias, incident IDs, and/or incident ID aliases are being assigned or unassigned. In this example, the IE type fields 701, 706 may both be assigned to a value of 000 to indicate that only an updated group alias is being assigned in this PDU, or may be set to different values to indicate a group ID 011 in IE type field 701 and an updated group alias in IE type field 706. Other possibilities exist as well. For example, the following mapping between IE type values and function might be used:
IE Type 000: Updated Group Alias
IE Type 001: Incident ID
IE Type 010: Incident ID alias
IE Type 011: Group ID The reserved field 903 is reserved in this example, but may be used for other purposes in other embodiments, as set forth further below.

The encoding field 708 indicates a type of encoding that is being used to represent text characters in character fields 710-740. For example, UCS2, UTF8, or UTF16 (big Endian or little Endian) could be indicated via encoding field 708. Finally, character fields 710-740 include the encoded text-based updated group alias to be temporarily associated with or assigned to the group represented by the group ID in the group ID field 702. The fields 702-740 may be populated, for example, by a network operator at a console such as console 121 in FIG. 1 in response to an incident, and transmitted to group subscribers via one or more of BSs 101 and 151. For example, a report of a boater going overboard in a river could be responded to by a river rescue team normally using a group, or directed via a dispatcher to use a group, having a group ID of $123456_{16}$ on a predetermined traffic channel Y (or assigned to traffic channel Y in a trunked system). Additional emergency responders arriving at the scene and attempting to tune to a same channel as the river rescue team would have to monitor several channels for a period of time in order to determine if they are on the correct channel, or would have to transmit on each possible channel a request for someone to confirm that he or she is on the correct channel, wasting valuable bandwidth and time in an emergency situation. However, by allowing a console operator to dynamically and temporarily push out an updated group alias to all radios associated with group ID $123456_{16}$ and replace a previously provisioned group ID and/or group alias stored at the radios and associated with the group ID with a more useful textual description of one or more of the temporary location, purpose, and function of the group, new arrivals on the scene can simply change channels or scan channels until a display on their radio indicates a text-based updated group alias of "River Search and Rescue" or some variation thereof (e.g., "River S & R"), perhaps in accordance with the display capabilities of the radios or the amount of bandwidth available. The new arrivals can then still use their pre-configured group ID to transmit and receive to the group, while the updated group alias and perhaps stored group ID is displayed on the new arrival's radio device when the radio is tuned to the group and/or channel and/or when the new arrival's radio device is involved in communications on the group and/or channel.

The CRC field 742 includes a CRC value that is used to determine the validity and/or integrity of the PDU set illustrated in FIG. 7, including fields 702-740. Although not illustrated in FIG. 7, dependent upon the structure and/or contents of header portion 602, additional padding fields may be added in payload 604 before the CRC field 742.

Importantly, the SUs receiving the updated group alias and processing the group ID field 702 and character fields 710-

740, responsive to finding a group ID match, do not permanently replace, overwrite, or delete the previously provisioned group alias and/or group ID that is locally stored at the SU. Rather, the SU continues to use the group ID (for example, $123456_{16}$) to transmit messages (over the air) to the associated group and to identify received messages as addressed to the associated group, but uses the received updated group alias for display when tuned to or communicating with the group.

Returning to FIG. 5, and at step 506, whenever the SU is tuned to the particular group associated with the received updated group alias, and/or whenever transmitting or receiving to or from the particular group, a local updated group alias store may be referenced to determine if an updated group alias is available and, if so, is displayed on a screen of the SU in place of or in addition to the previously provisioned group ID or group alias in order to provide improved and/or quicker access to desired groups and/or channels during emergencies, and perhaps at other times. In one embodiment, the SU may be configured to transmit or embed the updated group alias (in addition to the group ID) in transmissions originating at the SU and destined for the group. The BS receiving the transmission may then use this information to ensure that the SUs in the group have the latest updated group alias associated with the corresponding group ID, and may re-use the updated group alias in the repeated transmission to make sure all existing or new radios subscribed to the group have been provided with the updated group alias. Similarly, in a DCM, other receiving SUs could extract the updated group alias and ensure that their updated group aliases are up to date.

To facilitate the temporary storage of the updated group alias, the updated group alias may be stored in a volatile memory such as RAM 304, or may be stored in an area of static memory 316 separate from any area where the group ID is stored. A table associating received updated group aliases with group IDs and/or pre-provisioned locally stored group aliases may also be stored in one of RAM 304 or static memory 316, and may take the form of a lookup table as illustrated in Table I below.

TABLE I

Example Updated Group Alias Look-up Table

| Group # | Group ID | Pre-Provisioned Group Alias | Updated Group Alias |
|---|---|---|---|
| 1 | $123456_{16}$ | "Blue" | "River Search and Rescue" |
| 2 | $080808_{16}$ | "Red" | "Building Survivor Search" |
| 3 | $AFAFAF_{16}$ | "Green" | "Governor Vehicle Detail" |
| 4 | $121212_{16}$ | "Black" | |

At step 508, and responsive to one of an input (e.g., a user-manipulation of an input element on the SU such as a button, touch screen, microphone input recognized speech instruction, etc.), message (such as an incident ID unassign message similar to the incident ID assign message of FIGS. 6 and 7 but with one or both of a PDU type field and an IE type field set to indicate an updated group alias unassign instruction), or system trigger (e.g., a passage of time such as 1 to 30 minutes after initial assignment), the SU reverts to using the pre-provisioned (stored) first group ID and/or group alias and refrains from displaying the previously received updated group alias when tuned to, transmitting, or receiving on the group associated with the stored first group ID. For example, the SU may instead display the first group ID or first group alias associated with the first group ID ($123456_{16}$ or Blue) instead of the updated group alias "River Search and Rescue."

The input may be, for example, a detected input via an input device such as input 306 or touchscreen such as screen 305 indicating that the association between the first group ID and the updated group alias should be removed or discontinued.

Although FIG. 7 illustrates an 8-bit character encoding scheme, in other embodiments, 16-bit or greater (or lesser) character encodings could be used, resulting in respectively larger or smaller updated group alias assignment messages. Additionally, although 16 characters are shown in FIG. 7, in other embodiments, more or less than 16 characters could be used. The character encoding scheme and the number of characters may be dependent upon an ability of SU displays to display the information provided. Other possibilities exist as well.

III. Incident ID Updates

In addition to updated group aliases, incident IDs can be assigned to a particular incident in order to provide an easier way for multiple groups, each with its own group ID and perhaps responding to a same incident, a dynamic and automated way to participate in conversations with all groups responding to the same incident.

Figure 8:
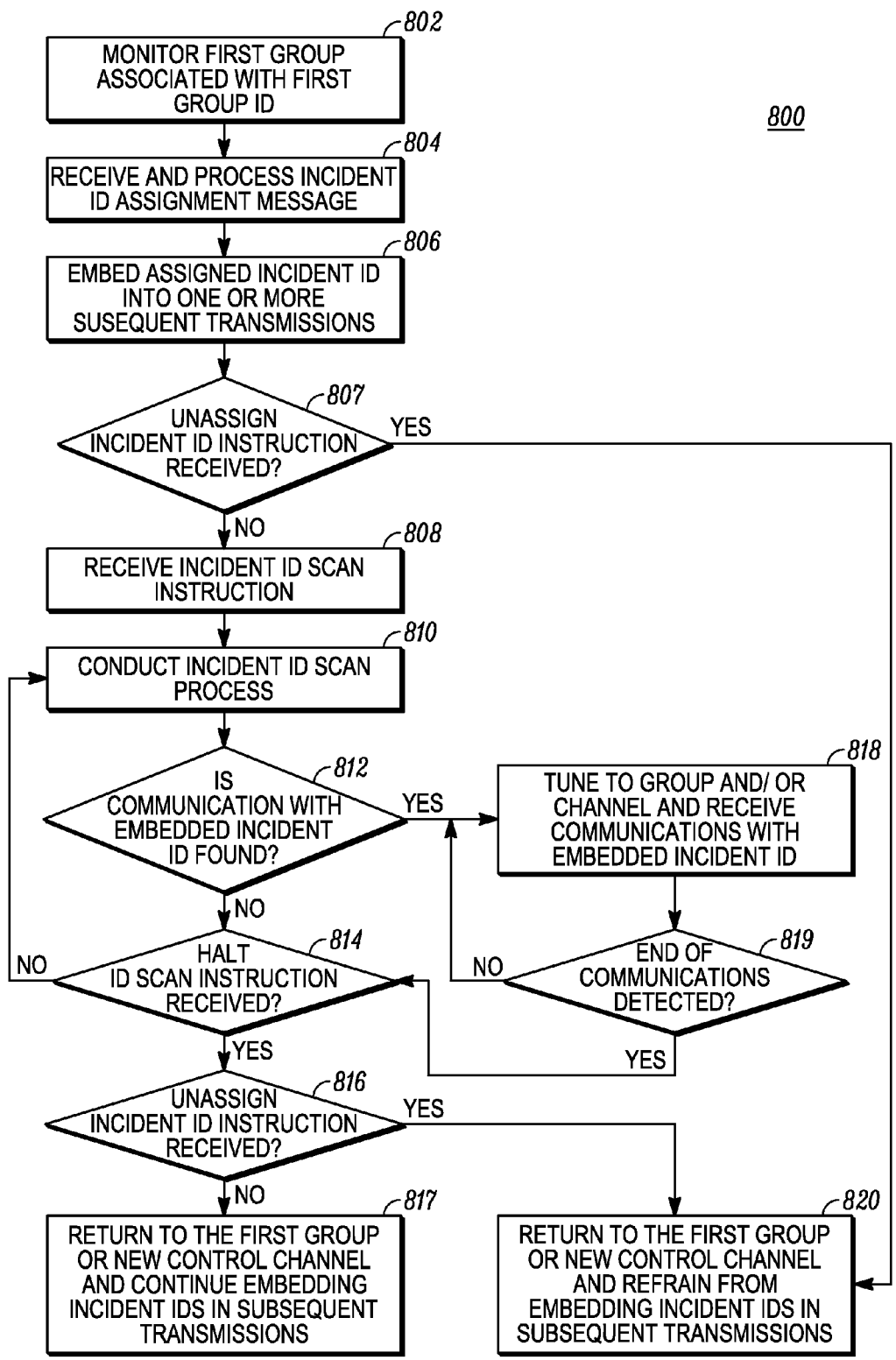
FIG. 8 is a flowchart illustrating a process used by a subscriber unit to receive, process, temporarily store, and use an updated incident ID in accordance with an embodiment of the present disclosure.

FIG. 8 is a flowchart illustrating a process 800 used by a subscriber unit to receive, process, temporarily store, and use an updated incident ID in accordance with an embodiment of the present disclosure. At step 802, a SU monitors a first group with which it is associated and/or subscribed for communications directed to the first group.

The SU could be operating in a conventional or trunked radio system in accordance with FIGS. 4A-4D. The SU may be configured via a codeplug configuration tool or software, a user selection, or over-the-air via a BS such as BS 101 with one or more group IDs associated with subscribed groups. The SU may monitor the subscribed groups in a similar manner to that already set forth above.

At step 804, the SU receives and processes an incident ID assignment message. During this process, the SU determines whether the received incident ID assignment message references one or more group IDs that match a pre-configured group ID at the SU (e.g., whether the group ID included in the incident ID assignment message references a group that the SU is currently subscribed to and thus matches a stored group ID at the SU). If a match is found, the incident ID is stored at the radio and an association is made between the received incident ID and the group, all future transmissions to that group are embedded with the received associated incident ID (step 806), and scans for any communications on other groups also associated with that incident ID can be conducted using the stored incident ID (steps 808-820). The incident ID and group or groups with which the incident ID is associated may be stored in a look-up table at the SU in accordance with Table II. As set forth in Table II, and in accordance with some embodiments, a provided incident ID may be accompanied by an incident ID alias that provides a text-based description of the provided incident ID. Other methods of storing incident ID information could be implemented as well.

TABLE II

Example Incident ID Look-up Table

| Incident ID | Associated Group IDs | Incident ID Alias |
| --- | --- | --- |
| $ABCDEFAB_{16}$ | $123456_{16}$, $098765_{16}$ | "Chicago River Boat Capsize" |
| $F1F2F3F4F5F6_{16}$ | $080808_{16}$, $191919_{16}$ | "Museum Fire Response" |
| $FEDCBAFE_{16}$ | $AFAFAF_{16}$, $BEBEBE_{16}$ | "Governor Detail" |

Figure 9:
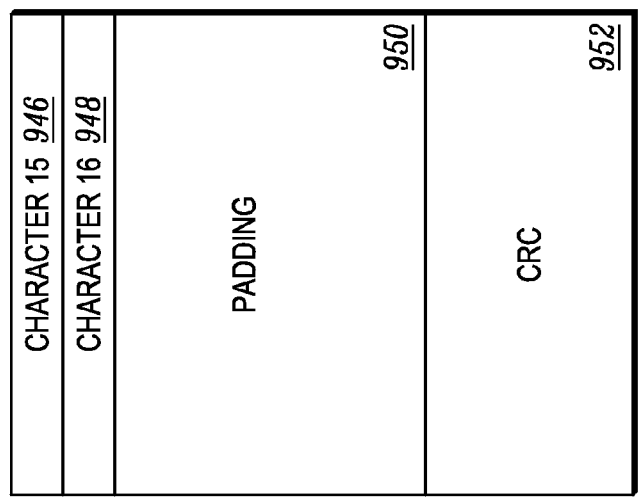
FIG. 9 is a block diagram illustrating an example PDU data structure accompanying the header structure of FIG. 6 that may be transmitted by a fixed terminal (base station/repeater/control terminal) to a subscriber unit to assign or unassign an incident ID to a subscriber unit in accordance with an embodiment of the present disclosure.
Figure 9:
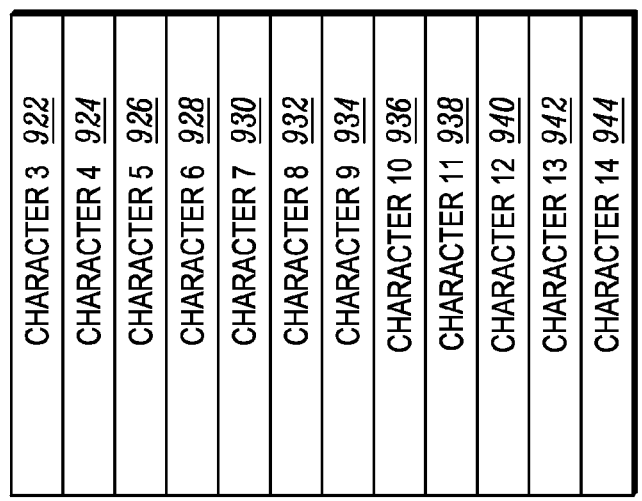
Figure 9:
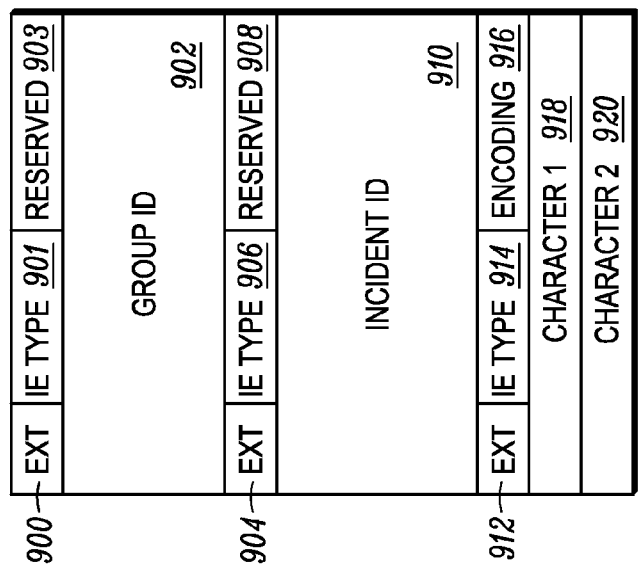

FIGS. 6 and 9 illustrate an example of an incident ID assignment message that may be used to temporarily assign an incident ID to one or more groups in accordance with some embodiments. As set forth above with respect to an updated group alias assignment message, FIG. 6 illustrates a general structure of a message header portion 602 that may be used to similarly signal an incident ID assignment or unassign message and accompanying incident ID assignment payload 604, and FIG. 9 sets forth a detailed example of an incident ID assignment payload 604. Since the fields in the message header portion 602 have already been described with respect to the updated group alias assignment message above, their description will not be repeated here. However, it is important to note that when the PDU type field 614 is used to differentiate between an updated group alias (assign or unassign) message and an incident ID (assign or unassign) message, the type field 614 will contain different values dependent upon whether an updated group alias payload follows or whether an incident ID assignment payload follows. Of course, in some embodiments, the PDU type field 614 may simply signal whether the payload 604 contains an assign or unassign instruction, and further fields in the payload 604 may differentiate between an updated group alias assignment and/or incident ID assignment.

FIG. 9 illustrates the payload portion 604 of an incident ID assignment message in accordance with some embodiments. As set forth in FIG. 9, the payload portion 604 of the incident ID assignment message may include a Group ID field 902, extension fields (EXT) 900, 904, information element (IE) type fields 901, 906, reserved fields 903, 908, and an incident ID field 910.

Group ID field 902, similar to group ID field 702, identifies a group ID to which an incident ID is being assigned or associated. Although group ID field 902 is shown in FIG. 9 as including only a single group ID, in other embodiments, more than one group ID may be included in group ID field 902 and/or more than one group ID field 902 may be present in a particular incident ID assignment or unassign message, such that the incident ID included in incident ID field 910 is indicated as associated with each one of the group IDs included in the group ID field(s) 902, and any SU that is subscribed to at least one group ID included in the group ID field(s) 902 processes the received incident ID assignment message or unassign message and associates or unassociates the received incident ID with at least the group IDs (and their associated groups) indicated in the group ID field(s) 902.

Returning to the example of FIG. 9, the SU receiving the incident ID assignment message in step 804 of process 800 will look to the group ID field 902 to determine if the group ID contained in the group ID field 902 matches any group IDs locally stored at the SU (and to which the SU is subscribed). As illustrated in FIG. 9, the group ID may be a 3-byte field. Other group ID encodings and lengths could also be used.

Extension fields 900, 904, similar to extension fields 700, 704, indicate whether further Information Elements are to be transmitted. In the example of FIG. 9, in which further Information Elements are illustrated as following the IE represented by fields 904-910, the extension fields 900, 904 would be populated with a value (such as a '1') indicating that additional IE's will follow each respective one. In another example where only an incident ID assignment message is being transmitted (e.g., limited to fields 902-910), the extension field 904 would be populated with a value (such as a '0') indicating that additional IE's do not follow this one.

The IE type fields 901, 906, similar to the IE type fields 701, 706, may be used, by themselves or in combination with the PDU type field 614 in the header portion 602, to designate a type of IE. In this example, the IE type field 901 may be set to a value of '011' to indicate group ID and IE type field 906 may be set to a value of '001' to indicate that an incident ID is being assigned.

The reserved fields 903, 908 are reserved in this example, but may be used for other purposes in other embodiments, as set forth further below.

The incident ID field 910 includes a 4-byte unique incident ID that identifies a unique incident and is used by the receiving SU to both embed in future transmissions (e.g., so that other receiving devices can scan for transmissions from the receiving SU now that it is associated with the incident via the received incident ID assignment message) and for searching other channels and/or groups (e.g., to find other transmitting devices that are also associated with the incident and have the same received incident ID embedded in their transmissions). While a 4-byte field is shown in FIG. 9, in other examples, the incident ID field 910 may have more or less than 4 bytes. In one example, a SU that is a member of group A having a group ID of $123456_{16}$ may receive an incident ID assignment message with the group ID $123456_{16}$ included in group ID field 902 and the incident ID of $ABCDEFAB_{16}$ included in the incident ID field 910. Finding a match between the group IDs, the SU would store the incident ID $ABCDEFAB_{16}$ and embed it in all future transmissions to the group associated with group ID $123456_{16}$.

To facilitate the temporary storage of the received incident ID, the incident ID $ABCDEFAB_{16}$ may be stored in a volatile memory such as RAM 304, or may be stored in an area of static memory 316 separate from any area where the group ID is stored. A table similar to Table II above associating the received incident ID with one or more group IDs may also be stored in one of RAM 304 or static memory 316.

As illustrated in FIG. 9, an updated group alias payload including fields 912-948 may be concatenated with the incident ID payload (fields 902-910), and fields 912-948 of the combined PDU set may correspond to fields 704-740 already described above with respect to FIG. 7. In some embodiments, no updated group alias payload may be included, and the incident ID payload 604 limited to the fields 902-910 illustrated in FIG. 9. In at least one other embodiment, reserved field 908 may be replaced with an encoding field similar to encoding field 708, fields 912-916 eliminated, and fields 918-948 shifted upwards and populated with an encoded text-based incident ID description (e.g., an incident ID alias) that provides an easy to read and easy to remember text-based description of the incident with which the incident ID included in incident ID field 910 is associated. If the character fields 918-948 are populated with an incident ID alias in this manner, the character fields 918-948 may be populated in a manner similar to character fields 710-740, and may be alternatively modified to include other text encodings as already set forth above.

Padding field 950 is an optional variable-length field that is used to pad the unused fields of the last PDU between the last character field 948 and the beginning of the CRC field 952. The CRC field 952 includes a CRC value that is used to determine the validity and/or integrity of the PDU set illustrated in FIG. 9, including fields 902-950.

Returning to FIG. 8, at step 806, whenever the SU transmits on a particular group, it determines whether that group is associated with an incident ID, perhaps by using a look-up table of previously received incident IDs similar to that illustrated above in Table II. If the particular group is associated with an incident ID, the SU retrieves the incident ID with which that particular group is associated, and embeds it, along with, or perhaps alternatingly with, the group ID that is also associated with the particular group, in the transmission.

Figure 10:
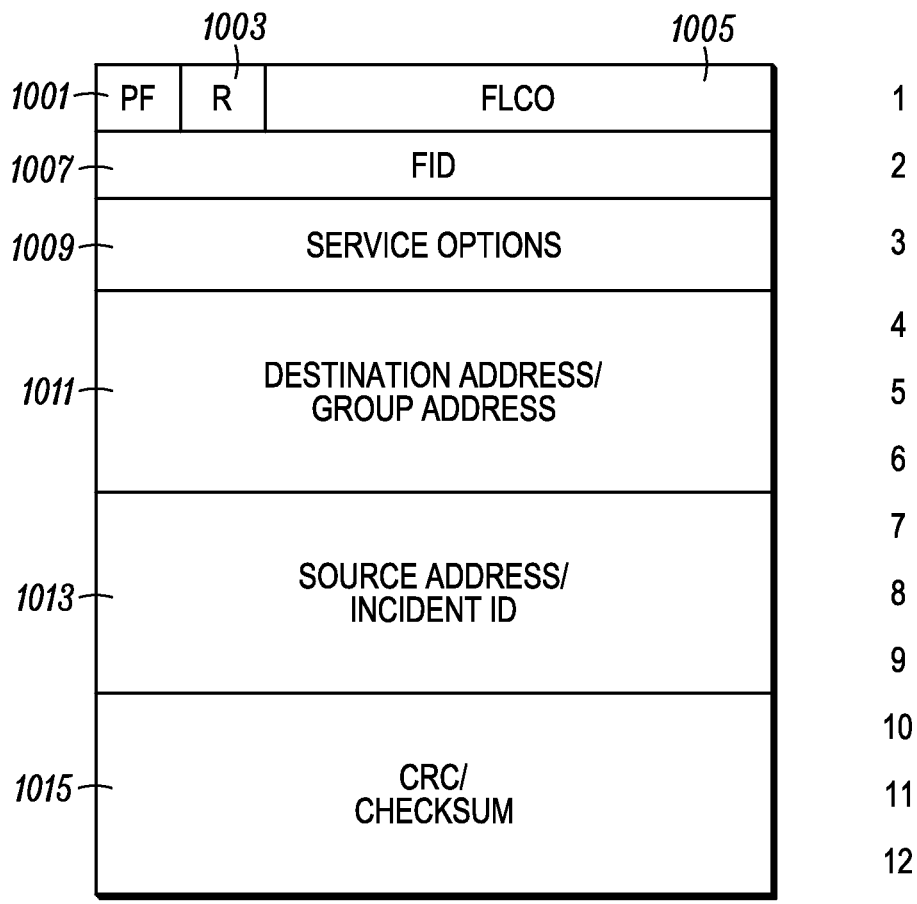
FIG. 10 is a block diagram illustrating an example link control structure that may be periodically transmitted to members of a group in order to update an incident ID for late-entering member radios of the group in accordance with an embodiment of the present disclosure.

FIG. 10 illustrates an example of a link control (LC) message 1000, consistent with the definition of a full link control opcode (FLCO) in the ETSI-DMR standard, that is periodically transmitted in accordance with a standard, such as for example, the APCO P25 or ETSI-DMR standard, and may be used to initially and/or periodically embed the incident ID in a transmission. The LC message (and/or portions thereof) may be included in a header such as that illustrated in FIG. 6 prior to transmission of voice or data frames, in a separate control message, and/or embedded within or between audio or data frames. Other possibilities exist as well. The ETSI-DMR standard defines the format of the first three octets of the LC message (including fields 1001-1009), which will not be discussed herein. The destination address/group address field 1011 is a 3-byte field that includes the destination address of the LC message 1000. In this case, the destination address/group address field 1011 is populated with the group ID of the particular group that is being transmitted to and with which the incident ID is associated. The source address field 1013 is a 3-byte field that includes the source address of the LC message 1000 (e.g., the address assigned to the SU). Finally, and depending on whether the LC message is a voice link control header or embedded link control, a CRC field 1015 (for voice link control headers) or a checksum field 1015 (and which may vary in size from that illustrated in FIG. 10) is included at the end of the LC message 1000. In order to facilitate periodic embedding of the incident ID in its transmissions, the SU transmitting to the particular group with which the incident ID is associated may periodically replace the source address in source address field 1013 with the incident ID stored at the SU and indicated as associated with the particular group. In this manner, late arriving SU that are either associated with the particular group or are searching for communications associated with the incident ID may receive the LC message 1000 and determine that the transmission being transmitted by the particular SU is associated with the incident ID periodically indicated in source address field 1013. Of course, other fields in LC message 1000, such as the destination address field 1011, or other types of messages, such as a common announcement channel (CACH) message, could be used to periodically transmit the incident ID. If there is a size mismatch between the stored incident ID and a space available in the fields 1011 and/or 1013, select portions of the incident ID may be truncated before populating in fields 1011 and/or 1013, a smaller incident ID size used in both the LC message 1000 and the incident ID field 910, or the incident ID split between multiple LCs, among other possibilities.

Returning to FIG. 8, at step 807, it is determined whether an unassign incident ID instruction has been received. If it is determined that no unassign incident ID instruction has been received, processing continues to step 808. If it is determined that an unassign incident ID instruction has been received, processing continues to step 820, where the SU may return to its state prior to receiving the incident ID assignment message at step 804, and which is described in more detail below.

Assuming that no unassign incident ID instruction is received at step 807, processing continues to step 808, where the SU receives an incident ID scan instruction. The incident ID scan instruction may be triggered by a user-manipulation of an incident ID scan input element on the SU (e.g., a button, touch screen, microphone input recognized speech instruction, etc.), received from some other SU or infrastructure device, or triggered at the SU by some system trigger (e.g., a periodic passage of time, responsive to receiving the incident ID assignment message, arrival at or near a location associated with the incident as determined by a GPS receiver within the SU and a location of the incident provided in the incident ID assignment message, etc.). At step 810, and responsive to receiving the incident ID scan instruction at step 808, the incident ID scan process begins.

At step 810, the SU scans each group and/or channel for communications that include the received and stored incident ID, perhaps in addition to scanning each of the channels for other subscribed group IDs and/or individual radio IDs. A set of groups and/or channels to scan may be based on all of the groups and/or channels known at the SU (e.g., programmed into memory or via codeplug), or may be based on groups and/or channels provided to the SU in the incident ID assignment message (e.g., perhaps via an additional field not illustrated in FIG. 9). In an embodiment in which the SU is already configured to scan multiple channels and/or multiple groups on a same channel for communications of a plurality of groups to which the SU is subscribed, the SU may be configured to scan both (i) a first plurality of pre-configured channels and/or groups for communications including an embedded incident ID that matches the received incident ID and (ii) a second plurality of pre-configured channels and/or groups associated with groups with which the first subscriber unit is explicitly subscribed. While in some embodiments, the first plurality and second plurality of pre-configured channels and/or groups may entirely overlap, in other embodiments, they may only partially overlap.

In any event, for each channel and/or group, the SU tunes its receiver to the channel and/or group and monitors the channel and/or group for an embedded incident ID matching the received and stored incident ID. For example, the SU may tune to each channel and/or group and monitor that channel and/or group for a predetermined period of time, such as 500 ms, for any indication of transmissions associated with the incident ID before moving on to a next channel and/or group. In one example, the SU may look for a voice header or for LC messages that include the incident ID embedded in a corresponding incident ID field or within one or more dual-use fields (such as the source and/or destination address fields noted above).

After scanning through at least one channel and/or group in the set, or through the entire set of channels and/or groups one or more times, the SU determines whether a channel and/or group has been located that includes an incident ID matching the received and stored incident ID at step 812. If no communication is found at step 812, processing continues to step 814 where the SU determines whether a halt incident ID scan instruction has been received. The halt incident ID scan instruction, similar to the incident ID scan instruction at step 808, may be triggered by a user-manipulation of a halt incident ID scan input element on the SU (e.g., a button, touch screen, microphone input recognized speech instruction, etc. and perhaps press or depress of the same button that triggered the incident ID scan instruction at step 808), received from some other SU or infrastructure device (such as an incident ID unassign message similar to the incident ID assign message of FIGS. 6 and 9 but with one or both of a PDU type field and an IE type field set to indicate an incident ID unassign instruction), or triggered at the SU by some system trigger (e.g., a passage of time such as between 1 and 30 minutes without receiving a subsequent incident ID scan instruction or renewal message, detected departure of an area at or near the location associated with the incident as determined by a GPS receiver within the SU and a location of the incident provided in the incident ID assignment message, etc.).

If no halt scan instruction is determined to have been received at step 814, processing proceeds back to step 810 where additional scanning or re-scanning of channels and/or groups in the set of channels and/or groups is conducted. On the other hand, if a halt scan instruction is received at step 814, processing proceeds to step 816, where it is determined whether an unassign incident ID instruction has been received. The unassign incident ID instruction may be triggered by a user-manipulation of a halt incident ID processing input element on the SU (e.g., a button, touch screen, microphone input recognized speech instruction, etc.), received from some other SU or infrastructure device (such as an incident ID unassign message similar to the incident ID assign message of FIGS. 6 and 9 but with one or both of a PDU type field and an IE type field set to indicate an incident ID unassign instruction), or triggered at the SU by some system trigger (e.g., a passage of time such as between 1 and 30 minutes without receiving a subsequent incident ID assign instruction or renewal message, detected departure of an area at or near the location associated with the incident as determined by a GPS receiver within the SU and a location of the incident provided in the incident ID assignment message, etc.). If it is determined at step 816 that an unassign incident ID instruction was received, processing continues to step 820, where the SU may return to its state prior to receiving the incident ID assignment message at step 804. For example, the SU may return to monitoring the first group associated with the first group ID at step 802. In another embodiment where the SU is operating in a trunked radio system, the SU may determine a current control channel in the system and return to idling on the control channel. In any event, the SU refrains from embedding the received incident ID in subsequent transmissions, and perhaps disables the use of any incident ID scan input elements. Other possibilities exist as well. If, on the other hand, it is determined at step 816 that an unassign incident ID instruction has not been received, processing continues to step 817, where the SU may return to monitoring the first group or find a current control channel in the system, but in contrast to step 820, continue to embed a corresponding incident ID in subsequent transmissions and perhaps leaves an incident ID scan input element function enabled.

Returning to step 812, if, on the other hand, it is determined at step 812 that a communication was found having an incident ID that matches the received and stored incident ID, processing proceeds to step 818 where the SU tunes to that channel and/or group and receives the audio, video, text, voice, or combination thereof on the identified group and/or channel. At step 819, it is determined whether communications on the group and/or channel tuned to at step 818 have ceased (either explicitly through an end of transmission indication, or perhaps due to a passage of time since a last transmission to the group, low signal quality, internal trigger to begin scanning other channels and/or groups associated with the incident ID, an explicitly received input activation on the SU indicating a user's desire to continue scanning other channels and/or groups associated with the incident ID, or other reason). If not, processing returns to step 818 where the SU stays tuned to the previous group and/or channel. If, however, an end of communications is detected at step 819, processing returns to step 814, and follows the flow already set forth above.

Advantageously, by allowing an incident ID to be assigned to multiple groups that are all associated with a particular incident, a console operator such as a dispatcher at console 121 in FIG. 1 can enter an incident ID (and optionally an incident ID alias that describes the incident and is associated with the incident ID, such as "Museum Fire Response") and dynamically and quickly provide a way for various groups responding to the incident (such as police, fire, employees of the Museum, etc.) to maintain their previous group structure, but also allow them to communicate with one another in response to executing an incident ID scan operation. Furthermore, there is no need to regroup all of the separate SUs into a single group, and once the incident is over, there is no further reprogramming of group membership (e.g., subscriptions) that needs to be executed at the SUs. Finally, no action needs to be taken by a user of the SU to dynamically subscribe to the incident. Rather, a console operator can cause each group of radios, or individual radios, to receive and store the incident ID by selectively transmitting incident ID assignments to the individual radios or the groups of radios. Other advantages arise as well.

IV. Infrastructure Devices

In accordance with the foregoing description, one or more infrastructure devices (such as console 121, system infrastructure 103, and/or BSs 101 and 151 of FIG. 1) may be configured to receive an updated group alias and/or incident ID mapping entered by a network operator, and responsively distribute the received updated group alias and/or incident ID mapping to corresponding SUs to use in the manner noted above. Additionally or alternatively, and especially in the case of the incident ID and incident ID alias, the infrastructure devices may play an active role in the embedding incident IDs in communications originating at SUs and may use the incident ID to store communications originating at the SUs for future reference, perhaps indexed or searchable via the associated incident ID.

For example, an infrastructure device (such as console 121 or system infrastructure 103) may receive an association, via a network operator, between a plurality of groups and a specified incident ID temporarily assigned to a particular incident. In response to receiving the association, the infrastructure device may transmit one of (i) an instruction to each of the plurality of groups that they are temporarily associated with the specified incident ID and that all subsequent transmissions should include the incident ID embedded therein and (ii) an instruction to each BS (such as BS 101) that communications directed to each of the plurality of groups temporarily associated with the specified incident ID are to be embedded with the specific incident ID prior to being repeated or otherwise forwarded. For example, a BS in receipt of a communication may determine whether the communication already includes an embedded incident ID and, if not, embed a corresponding incident ID in the communication before repeating it towards its intended group recipients. The BS may use a look-up table similar to that set forth above in Table II to determine, perhaps based on a target destination group of the communication, what incident ID and/or incident ID alias should be embedded in the communication. Additionally, in the event the BS detects that an incident ID is not embedded in the communication, and in addition to embedded the incident ID, the BS may immediately or subsequently transmit another incident ID assignment message to the originating SU to ensure that it has the latest incident ID assignment.

The infrastructure device may periodically cause additional incident ID assignment messages to be transmitted in order to ensure that newly arriving SUs have the most up to date incident IDs (and perhaps incident ID aliases), and/or to renew the incident ID assignment for a further period of time.

In order to maintain a record of all communications transmitted during a particular incident, the BS or system infrastructure device may be configured to store (or cause to be stored) each communication associated with a particular incident with a tag including the incident ID and/or incident ID alias assigned to the group or groups to which the communication was directed so that all communications associated with a particular incident can be more easily retrieved at a future date in time. The communications may be compressed and stored digitally in a local or remote database, and attributes of the communications (such as time of day, length, incident ID, incident ID alias, source, group ID, updated group alias, etc.) provided in a corresponding and co-located or separately located database.

Furthermore, and responsive to one of a detected user input, received incident ID un-assign message (generated at the infrastructure device by a network operator or perhaps received directly from a SU), and an infrastructure device detected trigger, the infrastructure device may responsively transmit one of (i) an instruction to each of the plurality of groups that they are to de-associate with the specified incident ID and refrain from embedding the incident ID in subsequent transmissions and (ii) an instruction to each BS that communications directed to each of the plurality of groups temporarily associated with the specified incident ID are no longer to be embedded with the specific incident ID prior to being repeated or otherwise forwarded.

In the group alias context, an infrastructure device (such as console 121 or system infrastructure 103) may receive an association, via a network operator, between a group and an updated text-based group alias temporarily assigned to the group (e.g., via the group ID). The updated group alias preferably describes one or more of a location, purpose, and function of the group for at least a temporary period of time. Responsive to receiving the association, the infrastructure device transmits an instruction to all SUs that are currently subscribed to the group that they are to temporarily associate the specified updated group alias with the group ID but retain the first group ID in storage. The infrastructure device may periodically send out additional group alias assignment messages in order to ensure that newly arriving SUs have the most up to date group aliases, and or to renew the updated group alias assignment for a further period of time.

Responsive to one of a detected user input, received updated group alias un-assign message (generated at the infrastructure device by a network operator or perhaps received directly from a SU), and an infrastructure device detected trigger, the infrastructure device may responsively transmit an instruction to all SUs that are currently subscribed to the group that they are to disassociate the specified updated group alias with the group ID and revert to the stored group ID.

V. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. In a two-way radio frequency (RF) communications system having at least one fixed terminal, one or more channels, and a plurality of subscriber units, the method comprising, at a first subscriber unit:
monitoring, on a first channel, for communications of a first group associated with a first group identification (ID) stored at the first subscriber unit to which the first subscriber unit is subscribed;
receiving an incident ID assign message, addressed to one of the first group and the first subscriber unit, instructing the first subscriber unit that it is temporarily assigned to a particular incident and identifying an incident with a corresponding incident ID;
the first subscriber unit embedding the incident ID into one or more subsequent transmissions initiated at the first subscriber unit;
responsive to receiving an incident ID scan instruction, the first subscriber unit starting an incident ID scan process including scanning a plurality of pre-configured channels and/or groups for communications including an embedded incident ID that matches the received incident ID;
if a communication is detected on a particular one of the plurality of pre-configured channels and/or groups including an embedded incident ID that matches the received incident ID, tuning to the particular one of the plurality of pre-configured channels and/or groups;
responsive to one of a detected first user input, received incident ID un-assign message, and a first subscriber unit detected first trigger, halting the incident ID scan process; and
responsive to one of a detected second user input, the received incident ID un-assign message, and a first subscriber unit detected second trigger, refraining from embedding the incident ID into subsequent transmissions initiated at the first subscriber unit.

2. The method of claim 1, wherein the incident ID assign message also includes a text-based incident ID alias that describes one or more of a name, location, purpose, and function associated with the incident ID, the method further comprising, responsive to receiving the incident ID scan instruction, displaying the incident ID alias on the display substantially immediately.

3. The method of claim 1, wherein the incident ID assign message also includes an incident ID alias that describes one or more of a name, location, purpose, and function associated with the incident ID, the method further comprising, responsive to receiving the incident ID scan instruction, displaying the incident ID alias on the display after receiving the incident ID scan instruction and during the incident ID scan process.

4. The method of claim 1, wherein the halting of the incident ID scan is responsive to the first subscriber unit detecting a trigger, the trigger comprising a lapse of a predetermined period of time since receiving the incident ID scan instruction without receiving another subsequent incident ID scan instruction or renewal message.

5. The method of claim 4, wherein the predetermined period of time is between 1 and 30 minutes.

6. The method of claim 1, wherein the incident ID scan instruction is received responsive to a first user activation of an incident ID input interface on the first subscriber unit, and the halting of the incident ID scan is responsive to a second user activation of the incident ID input interface.

7. The method of claim 1, wherein the two-way RF communications system is a conventional radio system and the first channel a conventional channel.

8. The method of claim 1, wherein the two-way RF communications system is a trunked radio system, and the first channel a control channel on which subscriber units idle and monitor for new call notifications.

9. The method of claim 1, wherein the incident ID assign message indicates one or more groups with which the incident ID is associated, including at least the first group, and
wherein embedding the incident ID into subsequent transmissions initiated at the first subscriber unit comprises embedding the incident ID only into those subsequent communications directed to one of the one or more groups with which the incident ID is associated, and refraining from embedding the incident ID in those subsequent communications that not directed to the one of the one or more groups with which the incident ID is associated.

10. The method of claim 1, wherein the incident ID assign message comprises one of (i) a header having a type field set to a value reserved to indicate an incident ID assign instruction and (ii) a data burst having an information element (IE) field set to a value reserved to indicate an incident ID assign instruction.

11. The method of claim 1, further comprising, responsive to receiving the incident ID scan instruction, scanning both (i) the plurality of pre-configured channels for communications including an embedded incident ID that matches the received incident ID and (ii) a second plurality of pre-configured channels associated with groups with which the first subscriber unit is explicitly subscribed.

12. The method of claim 11, wherein the plurality of pre-configured channels and second plurality of pre-configured channels do not entirely overlap.

13. In a two-way radio frequency (RF) communications system having at least one fixed terminal, one or more channels, and a plurality of subscriber units, the method comprising, a first subscriber unit configured to:
monitor, on a first channel, for communications of a first group associated with a first group identification (ID) stored at the first subscriber unit to which the first subscriber unit is subscribed;
receive an incident ID assign message, addressed to one of the first group and the first subscriber unit, instructing the first subscriber unit that it is temporarily assigned to a particular incident and identifying an incident with a corresponding incident ID;

embed the incident ID into one or more subsequent transmissions initiated at the first subscriber unit;

responsive to receiving an incident ID scan instruction, start an incident ID scan process including scanning a plurality of pre-configured channels and/or groups for communications including an embedded incident ID that matches the received incident ID;

if a communication is detected on a particular one of the plurality of pre-configured channels and/or groups including an embedded incident ID that matches the received incident ID, tune to the particular one of the plurality of pre-configured channels and/or groups;

responsive to one of a detected first user input, received incident ID un-assign message, and a first subscriber unit detected first trigger, halt the incident ID scan process; and responsive to one of a detected second user input, the received incident ID un-assign message, and a first subscriber unit detected second trigger, refrain from embedding the incident ID into subsequent transmissions initiated at the first subscriber unit.

14. In a two-way radio frequency (RF) communications system having at least one fixed terminal, a plurality of channels, an infrastructure device, and a plurality of subscriber units, the method comprising the steps of, at the infrastructure device:

receiving an association between a plurality of groups and a specified incident identification (ID) temporarily assigned to a particular incident;

responsively transmitting one of:

an instruction to each of the plurality of groups that they are temporarily associated with the specified incident ID and that all subsequent transmissions should include the incident ID embedded therein; and an instruction to each fixed terminal that communications directed to each of the plurality of groups temporarily associated with the specified incident ID are to be embedded with the specific incident ID prior to being repeated or otherwise forwarded; and responsive to one of a detected user input, received incident ID un-assign message, and an infrastructure device detected trigger, responsively transmitting one of:

an instruction to each of the plurality of groups that they are to de-associate with the specified incident ID and refrain from embedding the incident ID in subsequent transmissions; and an instruction to each fixed terminal that communications directed to each of the plurality of groups temporarily associated with the specified incident ID are no longer to be embedded with the specific incident ID prior to being repeated or otherwise forwarded.

* * * * *